INVENTORS
Donald F. Steele
Alfred W. Vasel

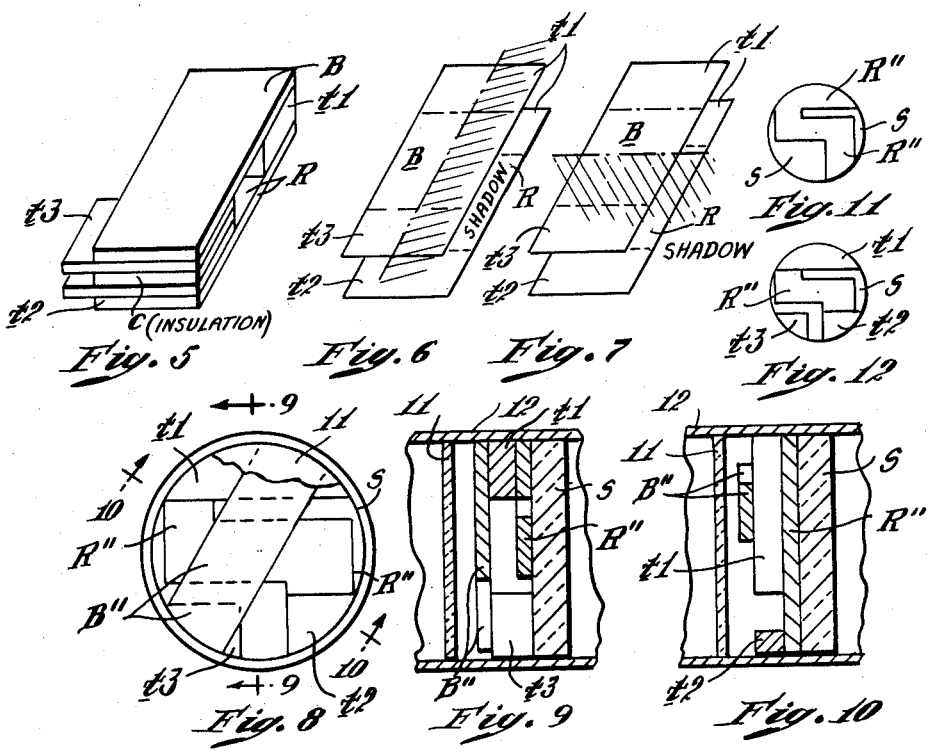
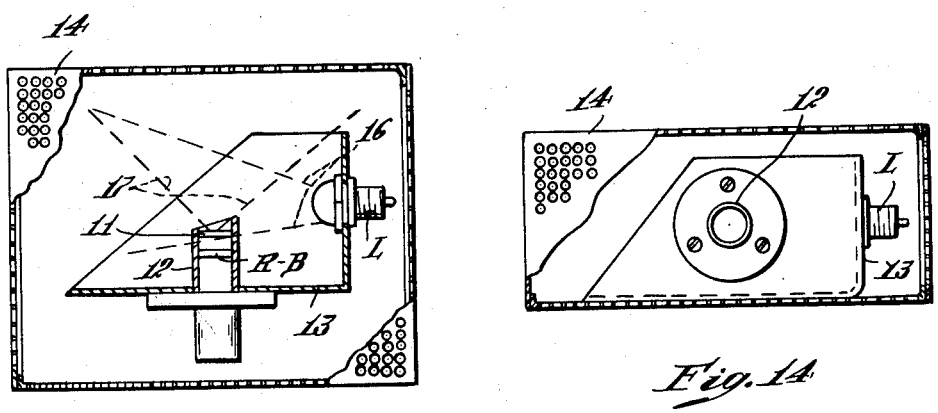

United States Patent Office 3,122,638
Patented Feb. 25, 1964

3,122,638
INFRARED DETECTOR SYSTEM FOR FLAME
AND PARTICLE DETECTION
Donald F. Steele, Cohasset, and Alfred W. Vasel, Brockton, Mass., assignors to Pyrotector, Incorporated, Hingham, Mass., a corporation of Massachusetts
Filed Jan. 22, 1959, Ser. No. 788,318
18 Claims. (Cl. 250—83.3)

This invention relates to apparatus and devices for light detection and the method of making photoelectric detection devices. More particularly the invention relates to detection of a particular band of frequencies in the light spectrum, that is the spectrum which includes infrared and ultraviolet as well as visible light.

One application of such a detector is in the sensing of a primarily infrared source such as a flame or incandescent body. Such a source may be detected by an infrared sensitive photocell, or a combination of photocells, but hitherto such devices or combinations have required critical adjustment to distinguish between an undesirable infrared source, such as a flame, and a harmless source such as sunlight or artificial light. Furthermore, harmless sources may cause a false indication when falling on one of a combination of photocells while another of the combination is in a shadow.

Thus, one object of the invention is to provide a detector which is particularly sensitive to a predetermined light frequency band. A further object is to provide a detector which does not have a false response when partly in shadow. A still further object is to provide improved apparatus for indicating the response of a photoelectric detector. Still another object is to provide apparatus for detecting smoke as well as the particular light frequencies of flame. Other objects will be apparent from the accompanying description.

According to the invention photoelectric detecting apparatus comprises at least two light responsive elements, one element being predominantly responsive to predetermined frequencies of the light spectrum and the other being predominantly similarly responsive to substantially different frequencies and oppositely responsive to other predetermined frequencies, means connecting said elements in series so as to provide the elements with a common junction in a current carrying circuit, and output means connected to said common junction and one end of one element for connecting a detector in parallel with said one element.

Further according to the invention, a photoelectric detecting device comprises a support, a layer of material on said support responsive to predetermined frequencies of the light spectrum, conductive terminals at spaced locations on said layer, and a body of material responsive to different frequencies of the light spectrum, said body overlying and extending entirely across an area of said layer between said terminals.

Still further according to the invention, light detecting apparatus comprises at least two photoresponsive devices, each device including two elements, one responsive to predetermined frequencies of the light spectrum, and the other responsive to different frequencies, said elements being connected in series and having a common junction, output means, and for each device a diode connected between said common junction and said output means, whereby the device having the greatest response supplies the controlling current to said output means.

Further according to the invention, apparatus for smoke or small particle detection comprises a radiation source to which the above-mentioned device responds, and means shielding said device from the direct radiation from said source, said source being disposed to radiate into a zone in which small particles divert light from said source to the device. Preferably the apparatus detects both small particles and particular light frequencies from an external source, and comprises an indicator capable of differentiating between light from the external source and light diverted from small particles.

For the purpose of illustration, typical embodiments of the invention are shown in the accompanying drawing in which:

FIG. 5 is an isometric view showing one form of photoelectric apparatus;

FIGS. 6 and 7 are isometric views showing the operation of the detector of FIG. 5 when partly in shadow;

FIG. 8 is a plan view of another form of photoelectric detector device;

FIGS. 9 and 10 are sections respectively on lines 9—9 and 10—10 of FIG. 8;

FIGS. 11 and 12 show steps in the manufacture of the detector of FIGS. 8 to 10;

FIG. 13 is a side elevation, partly in section, of a combined smoke and fire detection apparatus; and FIG. 14 is an end elevation of the apparatus of FIG. 13.

Figure 1:
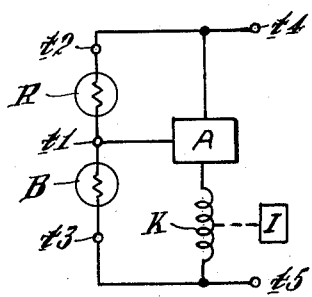
FIG. 1 is a schematic diagram of one form of photoelectric detecting apparatus.

As shown in FIG. 1, detection apparatus which will distinguish between flame and sunlight, for example, comprises a pair of photoelectric cells R and B, connected in series across two terminals $t4$ and $t5$. The cells have a common junction terminal $t1$, and respective series terminals $t2$ and $t3$. When a potential source E, e.g. cells act as a variable voltage divider controlling the voltage at the junction $t1$. The voltage at terminal $t1$ is applied to an amplifying or impedance matching device A which in turn controls gating means such as the coil K of a solenoid for actuating or energizing an indicator I, such as a lamp.

Figure 2:
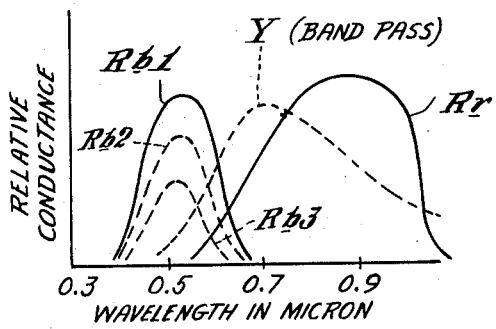
FIG. 2 is a graph showing the photoelectric response curves of detector devices used in the apparatus.

According to one aspect of the invention the cell R, which for convenience is called the red cell, is primarily responsive to a predetermined band of light frequencies, e.g. the infrared band indicated by the response curve $Rr$ of FIG. 2. Polycrystalline cadmium sulfide is preferable but lead sulfide, cadmium selenide and other compounds responsive to this band may be used. These substances increase, positively, in conductance when exposed to infrared light. Cadmium sulfide is preferable in a flame or near infrared detector because its peak sensitivity, as in curve $Rr$ of FIG. 2, is below 1 micron, and therefor the cell does not have a spurious response to changes in environmental heat (e.g. atmospheric) which, like black body radiation, is in the far infrared above 1 micron. The cell B, called the blue cell, is not only primarily positively responsive to light inside a band, e.g. visible blue to yellow, and outside the predetermined infrared band of the red cell R, but also responds oppositely, in this case negatively by a decrease in conductance, when exposed to radiation, e.g. infrared, outside its own blue to yellow band. One cell having such a negative response, as well as a positive response, is monocrystalline cadmium sulfide. Its normal response is indicated by the solid line curve $Rb1$ of FIG. 2, while its negative response in two intensities of infrared light are indicated qualitatively by the broken line curves $Rb2$ and $Rb3$.

The circuit of FIG. 1 operates in the following way. With the gating device K set to operate on 10 volts and the input impedance of the gating device K and matching or coupling means A at approximately 1 megohm, the red and blue cells will, in darkness, have approximately equal resistance (inverse of conductance), of approximately 100 megohms, all by way of example. The resistance of the blue cell and the parallel gating circuit will be approximately that of the parallel circuit, namely 1 megohm (1M). The 28 volt potential applied across the cells and parallel circuit will then be divided by approximately 100, providing at the junction $t1$, a 0.28 volt potential, well below the threshold for the gating device which, for example, is 10 volts. This photoelectric action in darkness is compared in Table I with the action under other light conditions.

*Table I*

|  | Dark | Sunlight | Flame and Sunlight |
|---|---|---|---|
| Red cell impedance ($Zr$) | 100M | 60K | 15K |
| Blue cell impedance ($Zb$) | 100M | 10K | 15K |
| $Zb$ and 1M | 1M | 10K | 15K |
| Voltage at $t1$ | 0.28 | 4 v. | 14 v. |

In the dark, the voltage at $t1$ is wholly inadequate. In sunlight which has an infrared as well as visible light composition the voltage has risen by virtue of a decrease in the blue cell resistance to one-hundredth that of the parallel circuit (1M). But the red resistance has also dropped, so that the voltage at $t1$ is $[10/(10+60)][29]=4$, still below the gate threshold. If, however, the cells are exposed to flame with a high infrared component, the red cell resistance not only drops, but the blue cell resistance rises, increasing the voltage at $t1$ to $$[15/(15+15)][28]=14$$

causing the gate to relay a signal to the indicator I.

Figure 3:
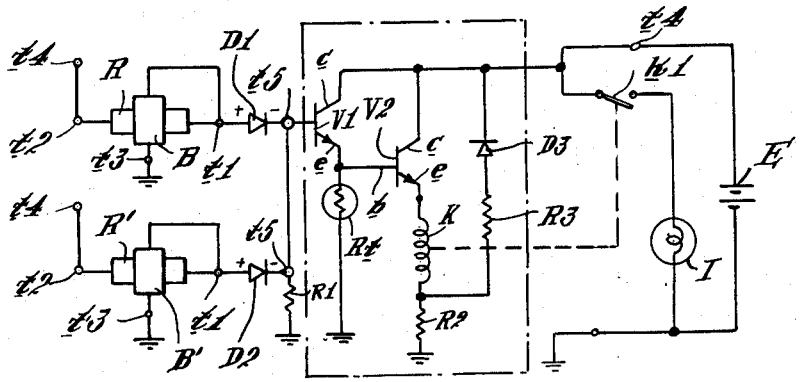
FIG. 3 is a schematic diagram of another form of photoelectric detecting apparatus.

The coupling device A of FIG. 1 may be merely a direct connection between the junction $t1$ and the gate K, however, a preferred circuit is shown in FIG. 3, wherein typical values of the components are as follows:

D1, D2 _____ Type 2T1 diode.
D3 _____ 22 volt Zener diode (Hoffman type ZA22).
V1 and V2 __ Type 905 transistor.
R1 _____ 2.2 megohms.
R2 _____ 500 ohms.
R3 _____ 500 ohms.
Rt _____ 300 kilohms, keystone type L1215 thermistor.
K1 _____ Sigma type 22RJC—5000HG relay.

In FIG. 3 are shown two detectors R—B and R'—B', each comprising a red cell and a blue cell. In each detector a transparent blue cell overlies the red cell as will be explained in detail hereinafter. Each detector has terminals $t2$ and $t3$ respectively connected to a terminal $t4$ of a power supply E and to ground. The junction terminal $t1$ of each detector is connected through a diode D1 or D2 to the input terminal $t5$ of an impedance matching and relay circuit Z.

The matching circuit comprises two emitter follower transistor stages V1 and V2 thermally compensated by a thermistor Rt. The output $e$ of the second stage V2 supplies current to the coil of relay K operating a contact $k1$. A voltage compensating circuit comprising a resistance R2 in series with the relay coil K, a resistance R3 and a diode D3. The relay contact $k1$ is in series with a lamp I across the power supply E.

The operation of the circuit of FIG. 3 is as follows. Detectors R—B and R'—B' are typically at different locations and hence will be exposed to different light conditions. Detector R—B, for example, may view more flame than detector R'—B', hence the detector R—B will deliver a high signal voltage to its output terminal $t1$ than detector R'—B'. The higher voltage of detector R—B will merely block conductance of the diode D2, and it will be the higher voltage of detector R—B which is applied to the matching circuit input terminal $t5$. The diodes D1 and D2 also isolate from each device a short circuit which may appear in another detector device.

The signal input to the matching circuit is reproduced at a lower impedance across the relay coil K and resistances R2, as a result of current amplification in the cascaded emitter followers V1 and V2. Changes in conductance of the transistors V1 and V2 caused by temperature change are compensated by a like change in the conductance of the thermistor Rt.

The diode circuit including the Zener diode D3 and resistors R3 and R2 draws current from the supply E and establishes at the junction of coil K and resistors R2 and R3 a voltage dependent on the source voltage E. If the source voltage increases above 28 v., the Zener diode conducts and raises the voltage at the above-mentioned junction. An increase in source voltage would also cause an increase in the voltage across coil K and resistor R2. Such an increase would, in the absence of the Zener diode circuit, cause the coil to give a spurious indication. However, with the Zener diode circuit the increased diode-produced voltage compensates for the increased voltage across coil K and resistor R2, so that the voltage across coil K remains proportional to the output which the controlling detector R—B or R'—B' would deliver if the source voltage remained constant at, for example, 28 volts. That is, erroneous increases in voltage across the coil K, as a result of increased source voltage applied across the detector R—B, and the matching circuit, are compensated by increased conductance of the Zener diode.

The operation of the circuit of FIG. 3 results in a closing of relay contact $k1$, when light conditions are such as previously described with respect to FIG. 1, and the lamp I then lights indicating the light condition.

According to one aspect of the invention, one cell overlies the other as shown in one form FIGS. 5 to 7, and in another form FIGS. 8 to 12.

In FIG. 5, the red cell R (or any cell sensitive to particular light frequencies) is substantially covered by a blue cell B (or any cell sensitive to substantially different frequencies). Soldered or otherwise conductively bonded to the red cell R are terminals $t1$ and $t2$. Terminal $t1$ is also conductively bonded to the blue cell B, while terminal $t2$ is separated from a similar terminal $t3$ on the blue cell by an insulator C. The detector structure of FIG. 5 is suitably mounted such that light falling on the red cell R must pass through the blue cell B.

The blue cell B may, in the case of monocrystalline cadmium sulfide, have a yellow to yellow-orange tint acting as a filter. As indicated by the dotted curve Y of FIG. 2, such a filter has a band pass which drops off sharply toward the response band $Rb1$ of the blue cell, and hence reduces the response of the red cell to blue cell frequencies. The filter effect does not cut off the passing of near infrared radiation nearly so sharply. The net result is that the filter effect of the blue cell B increases the sensitivity of the red cell to pure infrared light as compared to radiation, such as sunlight, having a substantial content of blue and visible light.

The structure of FIG. 5 prevents false indications as a result of shadows having a linear edge, or spot shadows, falling on one but not the other of the cells. In the prior art, the effect of a shadow covering the blue cell but not the red cell might be to raise the blue cell's resistance to 100 megohms while reducing the red cell's resistance (in sunlight) to 60 kilohms. With the blue cell and parallel circuit impedance ($Zb$ and 1M) at approximately 1M the voltage at $t1$ would be approximately $[1M/(1M+60K)][28]=26$ v., sufficient to trigger the gate falsely.

However various shadows falling on the detector of FIG. 5 act as follows. If a shadow, as shown in FIG. 6, having a linear edge falls on the blue cell B parallel to an axis through terminals $t1$ and $t2$ or $t3$, part of the blue cell and of the red cell will be highly resistive, and part will be of low resistance. Since the two parts of each cell are in parallel, a low resistance path will remain in each cell and the shadow will have no effect. If, as shown in FIG. 7, the shadow crosses both cells between their terminals, each cell will have a high and low resistance in series. However, the high resistance will prevail in both cells and the net effect will be as though both cells were in darkness. Again the shadow will not produce a spurious response as in the prior art.

Another novel structure for the detector R—B of FIGS. 1 and 3 is shown in FIGS. 8 to 12. First a red cell R" is formed on a ceramic support disk S in the shape of FIG. 11. As shown in FIG. 12, conducting terminals t1, t2 and t3 of indium, gold or silver evaporated film, frit or paste, for example, are then applied or attached, terminals t1 and t2 with their bases on opposite ends of the red cell area, and terminal t3 directly on the support S. A transparent blue cell crystal B" is then attached to the exposed ends of terminals t1 and t3. Thereby one end of each of the blue and red cells is conductively bonded to the common junction t1 while the other ends are bonded respectively to terminals t2 and t3 which are insulated from each other by the supporting disk S. The completed detector is shown in FIGS. 8 to 10 assembled with a frosted glass diffusing disk 11 in a tube 12.

Whereas the blue cell B of FIGS. 5 to 7 substantially entirely overlies the red cell R, in FIGS. 8 to 12 the overlie is not complete. However, spurious effects of a shadow are avoided by the disk 11 or other diffuser so that a line or spot shadow cannot fall only on the blue cell. It is also possible to dispose the cells side by side if the diffuser eliminates all shadow, but with a sacrifice of sensitivity.

Figure 4:
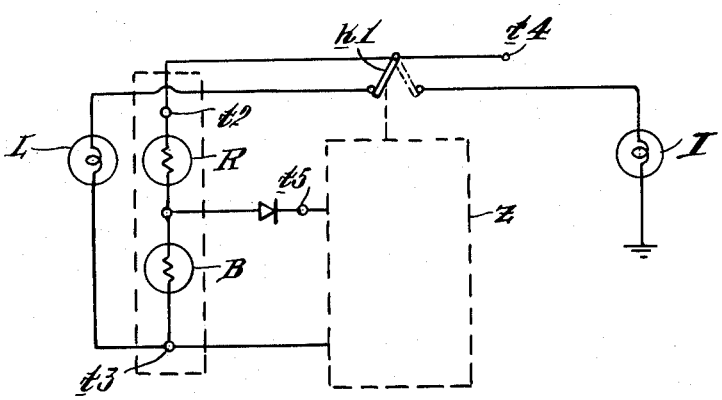
FIG. 4 is a schematic diagram of a further form of photoelectric detecting apparatus.

The principle of the present invention is particularly useful for smoke or other small particle detection as shown in the flame and smoke detection apparatus of FIGS. 4, 13 and 14.

As shown in FIGS. 13 and 14, the detector cell assembly R—B is mounted in a tube 12 close to a diffusing disk 11. The cell assembly and wire leads (not shown) to its terminals t1, t2 and t3 are of course insulated from the tube. The tube is mounted on a bracket 13 within a protective cage 14 of wire mesh or perforated sheet metal. Also mounted on the bracket 13 is a lamp L providing a source of radiation to which the detector R—B differentially responds, in this case infrared. The tube 12 is shaped to shield the detector from the direct rays 16 of the lamp L while affording a zone of vision 17 for the detector, which zone extends through cage 13 to the exterior. The exterior is thus under surveilance for any flame or similar infrared condition which is detected as described above. At the same time smoke or other small particles may drift, without forced circulation, through the cage into the zone of vision 17 of the detector cells. Where the zone of vision 17 is intersected by the rays 16 from the lamp L, infrared radiation is reflected or diverted to the detector cells. The detector being designed for infrared detection will then produce a sufficient signal to activate the gate and indicating device as described below.

In FIG. 4 is shown the circuit of the flame and smoke detecting apparatus of FIGS. 13 and 14. The infrared lamp L is connected through a contact normally made by the relay contactor k1 to the power terminal t4. The red cell R and blue cell B are connected to the matching and gate circuit Z as in FIG. 3, and in response to an external infrared source cause the relay contactor k1 to connect the indicator lamp I to the power terminal t4 so that the lamp I lights continuously so long as the infrared source persists.

If, in the absence of an external infrared source, smoke, fumes or vapor are present, these will cause the infrared lamp L to activate the detector and the gating circuits Z. When the relay of the gating circuit transfers its contactor k1, power to the lamp L is interrupted thereby extinguishing the infrared lamp L at the same time that the indicator lamp I is lighted. With the lamp L extinguished, the detector and gating circuit are deactivated after a short time delay inherent in the relay, and the contactor k1 transfers power from the indicator lamp I to the infrared lamp L. The indicator lamp I is thereby repeatedly lighted and extinguished whenever smoke is detected.

On the other hand the indicator I is lighted continuously when flame or a like external infrared source is detected. The indicator circuit thus distinguishes between an external infrared condition and the presence of small particles, and permits simultaneous surveilance of a space for flame and smoke by a single detector. Since the detecting and gating circuits respond only to external radiation of the same frequency characteristic as the infrared lamp L, and are unresponsive to ambient light such as artificial or sunlight, the detecting cells need not be light shielded as in prior smoke detectors. The present detector is therefor particularly advantageous for smoke detection alone, by virtue of its local infrared source and the sensitivity of the detector to primarily only infrared frequencies. It will be understood that the frequency of the local radiation source and of the detector response may be other than infrared, so long as it has a characteristic different from the ambient light. The local source and detector may have the same frequency characteristic as ambient light if they respectively emit and respond to light of a modulation characteristic different from that of the ambient light.

It will thus be understood that the present disclosure is for the purpose of illustration only and that the invention includes all modifications and equivalents within the scope of the appended claims. For example, while a direct current power source has been shown, the circuit of FIG. 1 may be operated from an alternating current source by using a thyratron as the impedance matching device A, and placing an integrating capacitance in parallel with the relay solenoid K. And although the differential detection of infrared frequencies has been described, other frequencies from one or more discrete bands of the light spectrum may be detected by differentiating them from other frequencies and bands.

We claim:

1. Photoelectric detecting apparatus comprising at least two light responsive elements, one element being predominantly responsive to predetermined frequencies of the light spectrum and the other element being predominantly similarly responsive to substantially different frequencies and oppositely responsive to predetermined frequencies other than said different frequencies, means connecting said elements in series and with a common junction in a current carrying circuit, and output means connected to said common junction and one end of one element for connecting a detector in parallel with one of said elements, whereby the opposite response of said other element to light of said predetermined frequencies increases the effect of the response of said one element.

2. Photoelectric detecting apparatus comprising at least two light responsive elements, one element being predominantly responsive to a first band of frequencies of the light spectrum and the other element being predominantly similarly responsive to a substantially different band of frequencies and oppositely responsive to said first band of frequencies, means connecting said elements in series and with a common junction in a current carrying circuit, and output means connected to said common junction and one end of one element for connecting a detector in parallel with one of said elements, whereby the opposite response of said other element to light of said predetermined frequencies increases the effect of the response of said one element.

3. Photoelectric detecting apparatus comprising at least two light sensitive elements, one element responding to the red-to-infrared band of the light spectrum by an increase in its conductivity, the other element responding to visible light other than red by an increase in conductivity and responding to the red-to-infrared band by a decrease in conductivity, means connecting said elements in series and with a common junction in a current carrying circuit, and output means connected to said common junction and one end of one element for connecting a detector in parallel with one of said elements.

4. A photoelectric detection device according to claim 3 wherein the said other element is a body of monocrystalline cadmium sulfide.

5. A photoelectric detection device according to claim 3 wherein the first said one element is a body of material selected from the group consisting of polycrystalline cadmium sulfide, lead sulfide, and cadmium selenide.

6. Photoelectric detecting apparatus comprising a plurality of devices each including at least two light responsive elements, one element being predominantly responsive to predetermined frequencies of the light spectrum and the other element being predominantly similarly responsive to substantially different frequencies and oppositely responsive to predetermined frequencies other than said different frequencies, means connecting said elements in series and with a common junction in a current carrying circuit, output means connected to said common junction and one end of one element for connecting a detector in parallel with one of said elements, and for each device a diode connected between said common junction and said output means.

7. Photoelectric detection apparatus comprising at least two photoresponsive devices, each device including two elements, one responsive to predetermined frequencies of the light spectrum, and the other responsive to different frequencies, said elements being connected in series and having a common junction, a single output means, and for each device a diode connected between said common junction and said output means, said diodes being connected such that conductance of one diode tends to block conductance of other diodes and only one of said devices is coupled to said output means at a time.

8. Photoelectric detection apparatus comprising at least two photoresponsive devices, each device including two elements, one responsive to two predetermined frequencies of the light spectrum, and the other responsive to different frequencies, said elements being connected in series and having a common junction carrying a signal dependent on the light response of the device, variable impedance means having an input and an output terminal, a gating device connected to said output terminal, and for each device a diode connected between said common junction and said input terminals, whereby the photoresponsive device producing the greatest signal controls the gating device through said variable impedance means.

9. Photoelectric apparatus for detecting small particles comprising a device including at least two light responsive elements, one element being predominantly responsive to a first band of predetermined frequencies of the light spectrum and the other element being predominantly similarly responsive to a substantially different band of frequencies, means connecting said elements in series and with a common junction in a current carrying circuit so that said cells together respond primarily only to one of said bands to produce a significant voltage at said junction, output means connected to said common junction and one end of one element for connecting a detector in parallel with one of said elements, a source of radiation predominantly in only said first band of light frequencies, and means shielding said device from the direct radiation from said source, said source radiating into a zone in which small particles divert light from said source to the device, whereby said device may be exposed to light other than of said one band without falsely responding.

10. Photoelectric detecting apparatus for detecting small particles comprising a device including at least two light responsive elements, one element being predominantly responsive to predetermined frequencies of the light spectrum and the other element being predominantly similarly responsive to substantially different frequencies, means connecting said elements in series and with a common junction in a current carrying circuit, whereby the voltage at said junction reaches a selected value only when light of said predetermined and different frequencies failing on said device exceeds a selected ratio, output means connected to said common junction and one end of one element for connecting a detector in parallel with one of said elements so that said detector responds only when said voltage reaches said selected value, a source of radiation to which said device particularly responds so as to increase said selected ratio, and means shielding the device from the direct radiation of said source, said source being disposed to radiate into a zone in which small particles divert light from said source to the device, thereby to cause said detector to respond to the diverted light, whereby said device may be exposed to light other than of said one band without falsely responding.

11. Apparatus for detecting small particles in a space under surveillance comprising a photoelectric detecting device disposed to view said space and ambient illumination in the space, said device being responsive only to light of a characteristic different from said ambient illumination, a source radiating light of said different characteristic, and means shielding the device from the direct radiation of said source, said source being disposed to radiate into a zone in which small particles divert light from said source to the device and cause said device to respond, whereby a single device viewing ambient illumination responds only to light in said space of said different characteristic and to light diverted from said source.

12. Apparatus for detecting small particles in a space under surveillance comprising a photoelectric detecting device disposed to view said space and ambient illumination in the space, said device being responsive only to light of a characteristic different from said ambient illumination, a source radiating light of said different characteristic, means shielding the device from the direct radiation of said source, said source being disposed to radiate into a zone in which small particles divert light from said source to the device and cause said device to respond independently of the ambient illumination, a power source and an indicator actuated thereby, and a detector controlled by said device comprising relay means for connecting said power source to said radiation source in the absence of small particles and for disconnecting the power source from said radiation source and connecting it to said indicator in the presence of small particles, whereby said indicator is repeatedly actuated and deactuated when small particles are detected, and is actuated continuously when light of said different characteristic is viewed.

13. Apparatus for detecting small particles in a space under surveillance comprising a photoelectric detecting device disposed to view said space and ambient illumination in the space, said device being responsive only to light of a characteristic different from said ambient illumination, a source radiating light of said different characteristic, means shielding the device from the direct radiation of said source, said source being disposed to radiate into a zone in which small particles divert light from said source to the device and cause said device to respond to small particles and light of said different characteristic independently of the ambient illumination, and indicating means controlled by said device including means causing the indicator to give a different indication when the device responds to small particles than when the device responds to light of said different characteristic.

14. Photoelectric detecting apparatus comprising at least two light responsive elements, one element being predominantly responsive to predetermined frequencies of the light spectrum and the other element being predominantly similarly responsive to substantially different frequencies and oppositely responsive to predetermined frequencies other than said different frequencies, means connecting said elments in series and with a common junction in a current carrying circuit, a detector, output means connected to said common junction and one end of one element for connecting said detector in parallel with said one element; said detector including gate means controlled through said output means by the voltage at said junction, a power terminal in series with said elements and with said gate means, and voltage regulating means connected to said power source in parallel with said gate means thereby to compensate for variations in the voltage through said output means caused by variations in said power source.

15. Photoelectric apparatus for detecting light of predetermined frequencies in the presence of light of other frequencies comprising two light responsive elements, means connecting said elements in series and with a common junction in a current carrying circuit so that a voltage across said elements is divided at said junction proportionally to the respective responses of said elements, a detector connected in parallel with one of said elements to respond to a predetermined change of voltage at said junction, one element being predominantly responsive to light of said predetermined frequencies, and the other element being predominantly similarly responsive to light of said other frequencies and oppositely responsive to said predetermined frequencies, whereby an increase in light of said predetermined frequencies causes both of said elements to affect said predetermined change of voltage at said junction and cause said detector to respond.

16. Photoelectric apparatus for detecting the red-to-infrared radiation from flame in the presence of the visible and infrared radiation of ambient light which comprises first and second light responsive elements, means connecting said elements in series and with a common junction with a current carrying circuit so that a voltage across said elments is divided at said junction proportionally to the respective responses of said elements, a detector connected in parallel with the second said element to respond to a change of voltage at said junction, the first said element being predominantly positively responsive to light of red-to-infrared frequencies, and the second element being predominantly positively responsive to visible light and negatively responsive to infrared light, whereby the incidence of the infrared light from flame upon said elements causes both elements to effect the same change in voltage at said junction.

17. A photoelectric device for differentially detecting a source of red-to-infrared light in the presence of sunlight, comprising a first photoelectric cell of a material selected from the group of polycrystalline cadmium sulfide, lead sulfide and cadmium selenide predominantly responsive to the red-to-infrared band of the light spectrum, a second photoelectric cell of monocrystalline cadmium sulfide predominantly responsive to the visible-to-red band of the light spectrum, said second element being translucent and partially overlying said first element, means mounting said elements so that light passes through said second element before striking said first element, and means connecting said elements in series in a current carrying circuit and with a common junction so that the voltage at said junction is dependent on the response of said second overlying element.

18. Apparatus for detecting the infrared radiation of a flame and also smoke particles in a space illuminated with visible and infrared light, comprising a photoelectric device disposed to view said space, said device being differentially responsive to a selected ratio of red-to-infrared light to visible light so as to respond only when the red-to-infrared light predominate and said ratio exceeds a predetermined value, whereby the device discriminates against ambient illumination of predominantly visible light, said apparatus including a local, artificial source of red-to-infrared light radiating into said space, said photoelectric device being shielded from the direct radiation from said artificial source but being capable of viewing radiation from said source reflected from particles in said space, whereby said differentially responsive device can respond to a red-to-infrared source in said space such as flame and also to smoke particles in said space, while not responding to visible light in said space.

References Cited in the file of this patent

UNITED STATES PATENTS

| 2,248,985 | Gray | July 15, 1941 |
| 2,742,550 | Jeness | Apr. 17, 1956 |
| 2,783,390 | Mendenhall | Feb. 26, 1957 |
| 2,839,645 | Hester | June 17, 1958 |
| 2,939,361 | Hock | June 7, 1960 |

FOREIGN PATENTS

| 702,268 | France | June 3, 1930 |
| 702,821 | France | Apr. 17, 1931 |